Oct. 20, 1964  R. C. JOHNSON  3,153,268
WIRE ROPE SOCKET
Filed May 28, 1962
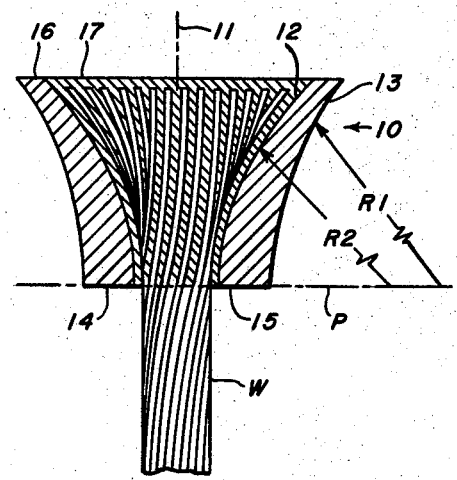
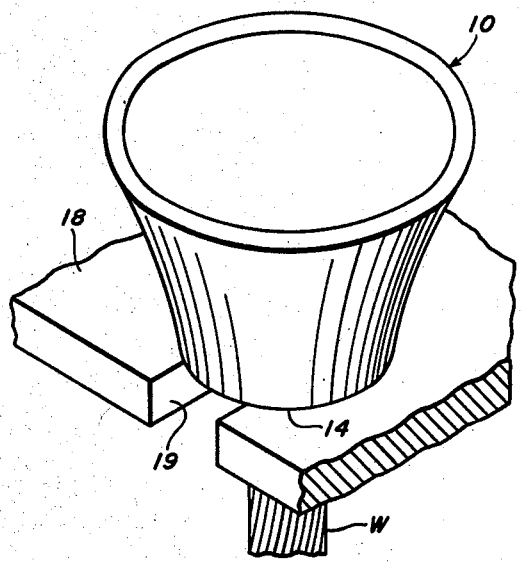
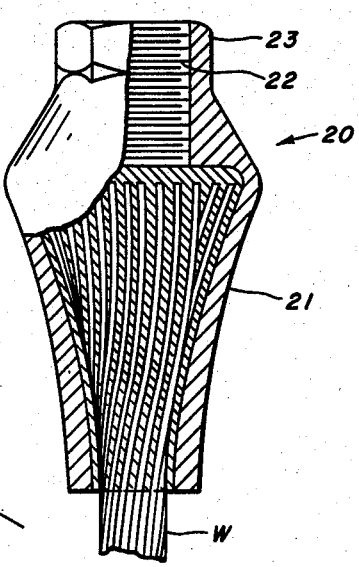
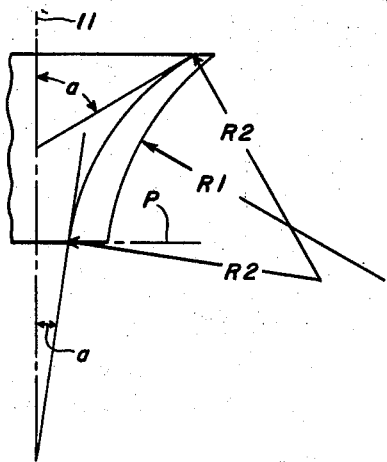
INVENTOR.
RAY C. JOHNSON
By Donald G. Dalton
Attorney

United States Patent Office 3,153,268
Patented Oct. 20, 1964

3,153,268
WIRE ROPE SOCKET
Ray C. Johnson, Endwell, N.Y., assignor to United States Steel Corporation, a corporation of New Jersey
Filed May 28, 1962, Ser. No. 198,284
1 Claim. (Cl. 24—123)

This invention relates to sockets for wire rope, and more particularly to sockets which are adapted to function in compression.

Wire rope sockets conventionally include a hollow steel shell into which the end of a wire rope is placed. The strands of the wire are "broomed out" and zinc or other suitable metal is poured into the socket around the broomed out end of the wire rope to form a connection between the rope and the socket. This connection is a friction connection between the zinc and the socket material, and not a chemical bond between the two. Sockets, with ropes zinced therein, are used to support the wire rope when it is tensioned, the socket being either held in tension by an anchored bolt, or compressed against a bearing plate, depending upon the application of the wire rope. The former is known as a tensile socket, the latter as a bearing socket. In some instances a socket is required that at times is under tension and at other times is in compression against a bearing plate. These sockets are known as combination sockets. This invention is particularly concerned with the bearing type sockets and combination sockets, i.e. sockets which at some time will be in compression.

It is a principal object of this invention to provide an improved design for wire rope sockets.

Another object of this invention is to provide a wire rope socket which affords maximum utilization of the socket material.

Expressed another way, it is an object of this invention to provide a wire rope socket of minimum weight.

Other objects and advantages of this invention will become apparent from the following description and accompanying drawings, in which:

FGURE 1 is a longitudinal sectional view of a bearing type wire rope socket of this invention with a wire rope zinced therein;

FIGURE 2 is a perspective view of the socket of FIGURE 1 bearing against a bearing plate;

FIGURE 3 is a longitudinal sectional view similar to FIGURE 1 of a combination type rope socket; and FIGURE 4 is a diagrammatic representation of a portion of a bearing type socket slightly modified from FIGURE 1.

There are two principal types of stress combinations which contribute to the failure of the steel socket material in bearing sockets. The first of these types of stress combinations is the stress caused by the socket bearing against the bearing plate which holds it combined with the hoop tensile stress. This stress combination is known as bearing plate stress. The other type of stress combination, known as zinc bearing stress, is caused by the zinc core forcing against the steel socket material combined with the hoop tensile stress. It has been determined that, in the region of the socket adjacent to the bearing plate, the more critical of the combined stresses is the bearing plate stress, and it is this stress, rather than the zinc bearing stress, which causes failure of the socket material in this region. However, in the region of the socket remote from the bearing plate the more critical of these two stress combinations is the zinc bearing stress, and it is this stress, rather than the bearing plate stress, which causes the failure of the socket material in this region. From an analysis of stress variations in a bearing socket it has further been determined that the socket has maximum resistance to failure because of bearing plate stress combination if the angle between a tangent to the inner wall of the socket and the central axis of the socket is small. On the other hand, the socket has a maximum resistance to failure from the zinc bearing stress combination if this angle formed by a tangent to the inner wall with the central axis is large. This angle is shown diagrammatically in FIGURE 4 and designated as A. Expressed another way, a minimum thickness of socket material is required to carry the bearing plate stress when this angle is a minimum; and, a minimum thickness of socket material is required to carry the zinc bearing stress when this angle is a maximum. Therefore, for maximum efficient utilization of socket material, this invention provides a socket in which this angle is a minimum in the region adjacent the bearing plate where the bearing plate stress combination is critical and this angle is a maximum in the region remote from the bearing plate where the zinc bearing stress combination is critical.

Referring now to FIGURE 1, a bearing type socket 10 constructed according to this invention is shown. The socket 10 is a tubular solid of revolution about a central axis 11, and has an inner surface 12 and an outer surface 13. The socket 10 includes a bearing face 14 defining a rope entry end 15 and a remote face 16 defining a remote end 17. The socket flares generally outwardly from the rope entry end 15 to the remote end 17, with the inner and outer surfaces 12 and 13 each being arcuate in longitudinal cross section. A tangent to the inne rsurface 12 at the rope entry end 15 forms a relatively small angle with the central axis 11 and a tangent to the inner surface 12 at the remote end 17 forms a relatively large angle with the central axis 11. Hence, at the rope entry end 15 where the bearing plate stresses are critical the angle is small which will give maximum utilization of the socket material. Also, at the remote end where the zinc bearing stress is critical this angle is relatively large which will more effectively utilize the strength of the socket material at the remote end. Thus, it can be seen that a minimum wall thickness of the socket material can be provided as its maximum strength efficiency is utilized.

It has further been found by evaluation of the stresses induced in the bearing type socket that the magnitude of the stresses at the remote end are less than at the rope entry end and hence, for this reason, the wall thickness at the remote end can be less than that at the rope entry end. Therefore, the socket wall tapers from a maximum thickness at the rope entry end to a minimum thickness at the remote end.

In the preferred embodiment the surfaces 12 and 13 are arcs of circles. The centers of the radii R1 and R2 of the arcs lie on plane P which passes through the rope entry end normal to the central axis 11. In order to provide for a tapering of the wall thickness from the rope entry end to the remote end, the radius R1 of the arc of the outer surface 13 is greater than the radius R2 of the arc of the inner surface 12. It is desirable, from a practical standpoint, that the arcs be arcs of circles since this facilitates the design and construction of patterns, but it is not essential. The critical factors are that the angle that a tangent to the inner surface at the rope entry end makes with the central axis be relatively small and the angle that a tangent to the inner surface at the remote end makes with the central axis be relatively large.

Theoretically when the angle at the entry end is zero degrees maximum efficiency is obtained with respect to bearing plate stress. However, a comparable overall efficiency of utilization of socket material will be obtained if the angle is increased slightly, to about 5°.

This slight increase in the angle will have a small adverse effect on the efficiency at the rope entry end, but it provides for a greater flaring at the remote end thus increasing that angle as is desired and giving a greater efficiency at the remote end. For this reason, it is often desirable that the angle at the rope entry end be between 0° and 5°. The angle of the tangent at the rope entry end with the central axis will be 0° when the centers of the arcs of the circles of the inner surface 12 and outer surface 13 lie on plane P. As shown in FIGURE 4 this angle can be increased by placing these centers on the entry side of plane P. However, these centers should never lie on the socket side of plane P. As used herein "on the socket side of plane P" means the same side of plane P on which the socket lies and "on the entry side of plane P" means on the opposite side of plane P from which the socket lies.

With a maximum utilization of the strength of the socket material, a minimum amount of socket material is required to withstand the combination of stresses without failure. A bearing type socket constructed according to FIGURE 1 or FIGURE 4 provides for a favorable stress distribution for maximum utilization of the strength of the socket material throughout.

Referring now to FIGURE 2, the bearing type socket of FIGURE 1 is shown in use. A plate 18 is provided which has a slot 19. The socket 10 has a wire rope or other stranded wire structure W zinced into it, and the wire rope W is under tension. The wire rope W extends through the slot 19, and the bearing face 14 is urged against a face of the plate 18 by the tension in the wire rope W.

Referring now to FIGURE 3, a combination bearing tensile socket is shown and designated generally as 20. The socket 20 has a body portion 21 similar in shape to that of the bearing socket of FIGURES 1 and 2. The socket 20 has a threaded dome 22 extending from the remote end 23 of the body. The dome 22 is provided so that during initial phase of construction, the wire rope may be maintained under tension by an anchored bolt (not shown) threaded into the dome. Then, in later stages of construction bearing plates are provided, as for bearing type sockets, and the bolts are removed. Then, in operation after the initial phase of construction, these combination sockets perform exactly as bearing type sockets.

While several embodiments of my invention have been shown and described it will be apparent that other adaptations and modifications may be made without departing from the scope of the following claim.

I claim:

A wire rope socket adapted for compression support and to receive a wire rope end which is secured therein by brooming out the wires of said rope end and filling the socket with molten zinc and the like, said socket comprising (a) a bearing face adapted to bear compressively against a bearing plate;

(b) an aperture in said bearing face for rope entry, adapted to accommodate un-broomed rope;

(c) an arcuate inner surface, flaring outwardly from said bearing face, adapted to receive broomed out rope and molten zinc and the like, said surface being definable as a surface of revolution of a substantially circular arc about a central axis, the center of said arc being so located that the angle formed between the axis and a tangent to the arc at the bearing face of the socket, measured on the side of increasing flare, is substantially between 0° and 5°;

(d) an arcuate outer surface, definable similarly to said inner surface except that said outer surface is definable by an arc of larger radius with its center so located with respect to distance from the axis as to provide an arc outwardly flaring from said bearing face and intersectable with the outwardly flaring inner surface, the combination of said inner and outer surfaces yielding a solid of revolution with arcuate walls gradually decreasing in thickness with increase in flare, whereby substantially maximum effective utilization of socket material is afforded.

References Cited in the file of this patent

UNITED STATES PATENTS

| | | |
|---|---|---|
| 1,390,750 | Bell | Sept. 13, 1921 |
| 2,686,963 | Freyssinet | Aug. 24, 1954 |

FOREIGN PATENTS

| | | |
|---|---|---|
| 459,472 | Great Britain | Jan. 8, 1937 |